(12) United States Patent
Waslowski et al.

(10) Patent No.: US 6,943,338 B2
(45) Date of Patent: Sep. 13, 2005

(54) OPTOELECTRONIC SENSOR

(75) Inventors: Kai Waslowski, Emmendingen (DE); Gerhard Merettig, Sexau (DE); Siegfried Ringwald, Elzach (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/163,266

(22) Filed: Jun. 4, 2002

(65) Prior Publication Data

US 2004/0099795 A1 May 27, 2004

(30) Foreign Application Priority Data

Jun. 29, 2001 (DE) .......................................... 101 31 685

(51) Int. Cl.[7] .............................................. H01J 40/14
(52) U.S. Cl. .................... 250/221; 250/214 C; 340/555
(58) Field of Search .......................... 250/214 L, 214.1, 250/208.2, 208.6, 559.31, 559.4, 221, 222.1, 559.11; 356/3.01, 3.08, 3.02, 3.03, 623, 433–435; 340/541, 545.3, 555–557

(56) References Cited

U.S. PATENT DOCUMENTS

| | | | | |
|---|---|---|---|---|
| 4,803,373 A | * | 2/1989 | Imamura et al. | 250/559.29 |
| 5,008,529 A | * | 4/1991 | Nakamura | 250/221 |
| 6,215,116 B1 | * | 4/2001 | Van Marcke | 250/221 |

FOREIGN PATENT DOCUMENTS

| | | |
|---|---|---|
| DE | 19808215 A | 9/1999 |
| DE | 19907547 A1 | 9/1999 |
| DE | 19907547 A | 9/1999 |
| DE | 19852173 A1 | 5/2000 |
| DE | 19852173 A | 5/2000 |
| DE | 19951557 A1 | 5/2000 |
| DE | 19951557 A | 5/2000 |
| DE | 20003675 U1 | 7/2000 |
| DE | 19808215 C2 | 3/2001 |
| JP | 56103310 A | 8/1981 |
| JP | 01-170886 | * 7/1989 |

OTHER PUBLICATIONS

English translation of DE–20003675.*
English translation of DE–19852173.*

* cited by examiner

*Primary Examiner*—David Porta
*Assistant Examiner*—Stephen Yam
(74) *Attorney, Agent, or Firm*—Townsend and Townsend and Crew LLP

(57) ABSTRACT

The invention relates to an optoelectronic sensor, in particular a reflection light scanner, at least comprising a transmitter for transmitting transmitted light, a receiver for outputting at least two received signals in dependence on reflected and received transmitted light, and an evaluation device by which, for determining whether an object or no object is disposed in a detection zone of the sensor, a difference of the received signals is comparable with a threshold and a positive or negative article detection signal can be produced in dependence on the result of this comparison, with a plurality of different thresholds being provided to produce a switching hysteresis. The evaluation device is made such that the result of a comparison of a sum of the received signals with a threshold value is provided as an additional criterion for the production of the article detection signal. The invention further relates to a corresponding method.

18 Claims, 5 Drawing Sheets

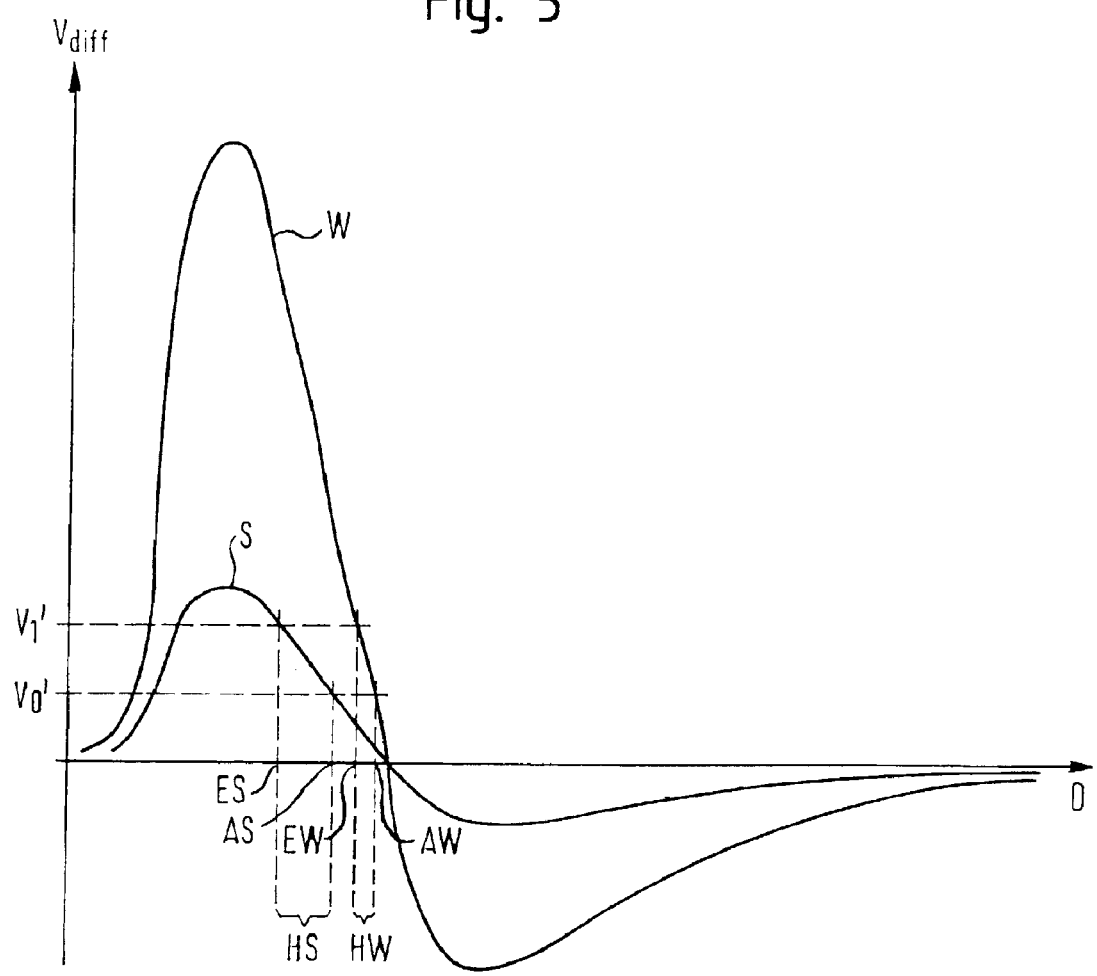

OPTOELECTRONIC SENSOR

BACKGROUND OF THE INVENTION

The invention relates to an optoelectronic sensor, in particular a reflection light scanner, at least with one transmitter for transmitting transmission light, with a receiver for outputting at least two received signals in dependence on reflected and received transmission light, and with an evaluation device by which a difference of the received signals to a threshold can be compared to determine whether an object or no object is disposed in a detection zone of the sensor, and a positive or a negative article detection signal can be produced in dependence on the result of this comparison, with a plurality of different thresholds being provided to produce a switching hysteresis. The invention further relates to a corresponding method.

Sensors of this kind are intended to detect whether and when an object enters into the detection zone and/or exits from this, whereas objects in other spatial zones should be ignored. For example, in the case of so-called background masking, the detection zone can be a foreground zone; if an object moves from the foreground zone into the background zone, the sensor should switch from a positive to a negative article detection signal.

Sensors of this kind usually work in accordance with the triangulation principle: A change in the distance of a reflecting object (scanning distance) results in a shift of the corresponding light spot on the receiver and to a corresponding change in the output signals of the receiver or of the differential signal of a subsequent differential circuit. If this differential signal exceeds or falls below a difference threshold as a consequence of such a change, the evaluation unit switches to a positive or to a negative article detection signal respectively. The threshold thus corresponds to a certain switching distance.

To avoid an unwanted multiple switching between the positive and the negative article detection signal with objects which are disposed or move at the switching distance, a switching hysteresis can be provided: As soon as the sensor switches from the positive to the negative article detection signal—or vice versa—the threshold forming the basis of the further comparison of the differential signal is also changed, and indeed such that the differential signal must now carry out a sufficiently clear change in the opposite direction in order to again bring about a change in the article detection signal.

The following problem can result for some applications with the known sensor and known detection method: To ensure an unambiguous detection of objects with an irregular, reflecting surface, the switching hysteresis and/or—with respect to the scanning distance—the positioning hysteresis can admittedly be enlarged. Since, however, objects with a different reflectance can result in different differential signals with the same respective scanning distance, the positioning hysteresis set is dependent on the reflectance of the relevant object in such a case. This has the result, for example, that black objects have a larger positioning hysteresis than white objects. Such different switching distances are, however, often unwanted.

SUMMARY OF THE INVENTION

It is thus an object of the invention to improve the detection capability for objects with a different reflectance.

This object is satisfied for a sensor of the kind initially named in that the evaluation device is made such that the result of a comparison of a sum of the received signals with a threshold is provided as an additional criterion for the production of the article detection signal.

For a corresponding detection method, the object is satisfied in that a sum of the received signals is compared with a threshold as an additional criterion for the production of the article detection signal.

In the invention, a further condition is therefore taken into account for the switching between the positive and the negative article detection signal in addition to the usual taking into account of a differential signal: The sum of the received signals is also determined and compared with one or more thresholds (sum thresholds) by means of a comparison device.

The invention is based on the recognition that the respective positioning hysteresis differs the least for objects with a different reflectance if the difference thresholds correspond to the distance for which both received signals are of equal size, that is, for which the difference in the received signals is zero. However, just such a selection of the difference thresholds cannot be realized with the known sensors since, with a difference threshold which lies within the RMS (root mean square) value of the noise of the differential signal or even below the value of zero, it is no longer ensured that a negative article detection signal is produced when the sensor does not see any object (a so-called look into space).

This possible error source is avoided with the invention by the additional comparison of the sum signal with a sum threshold. Erroneous detections which can occur when setting the difference threshold close to the value of zero are avoided by the sum comparison. The difference thresholds can thus be freely selected to be able to reduce the variation in the positioning hysteresis.

Depending on the application, it can be sufficient if a sum comparison is carried out for only one switching direction, that is, either only for a switching from the negative to the positive article detection signal (switching on) or only in the opposite direction (switching off).

The output signal of a differential switching and/or sum switching processing the at least two received signals, or the input signal of a subsequent comparison device, is to be understood as the differential signal or sum signal.

It must still be noted with respect to the invention that the infrared range or the ultraviolet range is also suitable for the transmitted light and the received light. A remission by the object to be detected can naturally also take place instead of a reflection of the transmitted light. Furthermore, it is also possible to provide a plurality of foreground zones and/or background zones by setting corresponding thresholds.

It is preferred with respect to the switching hysteresis if two respective thresholds are selected and taken into account—depending on the switching direction—both for the differential comparison and for the sum comparison. However, the invention can also be realized if a switching hysteresis is provided only for the differential comparison or for the sum comparison.

It is preferred with respect to the specific selection of the difference threshold if this amounts to zero or substantially to zero or close to the value of zero.

If a switching hysteresis is provided for the differential comparison, it is furthermore preferred if the two difference thresholds provided have different signs and/or are arranged substantially symmetrically around the value of zero. In the latter case, an especially low difference of the respective positioning hysteresis results for objects of a different reflectance.

In the case that a switching hysteresis is provided both for the differential comparison and for the sum comparison, an upper difference threshold preferably corresponds to a lower sum threshold. That is, only a total of three different thresholds thus have to be selected or determined, with the receiver noise being able to be taken into account in the same way for the two first-named thresholds. It is also possible, as an alternative to this—in favor of an especially versatile matching to the specific application to fix each difference threshold and each sum threshold differently.

To the extent that "upper" and/or "lower" thresholds are spoken of in connection with the invention, this in each case relates to the relative distance of the amount of the threshold from the value of zero independently of the sign of the threshold.

The invention will be described by way of example with reference to the drawings in the following.

BRIEF DESCRIPTION OF THE DRAWINGS

FIGS. 1 and 5 show differential signals in dependence on the scanning distance for objects of a different reflectance;

DESCRIPTION OF THE PREFERRED EMBODIMENTS

FIG. 5 illustrates the problems of the different positioning hysteresis for objects of a different reflectance. The differential signal $V_{diff}$ is entered over the scanning distance D, and indeed for a black object S and a white object W. The differential signal $V_{diff}$ has different values and also different gradients for different scanning distances D due to the different reflectance values of the two objects W, S. The two signal curves only intersect at the respective zero passage.

A lower and an upper difference threshold $V_0'$ and $V_1'$ respectively are shown for the example of a foreground reflection light sensor, that is, of a background masking. If an object approaches the sensor sufficiently closely and if, accordingly, the respective differential signal $V_{diff}$ exceeds the upper difference threshold $V_1'$, a positive article detection signal is produced (switching on points ES or EW). Only if the respective differential signal $V_{diff}$ subsequently again falls below the lower difference threshold $V_0'$ again does a switching to a negative article detection signal (switching off points AS or AW) take place.

This switching hysteresis, that is, the difference between the thresholds $V_1'$ and $V_0'$, is thus converted into a respective positioning hysteresis HS or HW respectively. Due to the different course of the differential signal $V_{diff}$ for the black object and the white object S and W respectively, the corresponding positional hystereses HS and HW respectively are not only of different lengths, they also extend—separately from one another—along different scanning distances D. This has the unwanted effect for the sensor that the switching between the negative and the positive article detection signals—and thus the recognition of the presence or absence of an object—takes place at completely different scanning distances for the black object S and the white object W.

Figure 1:
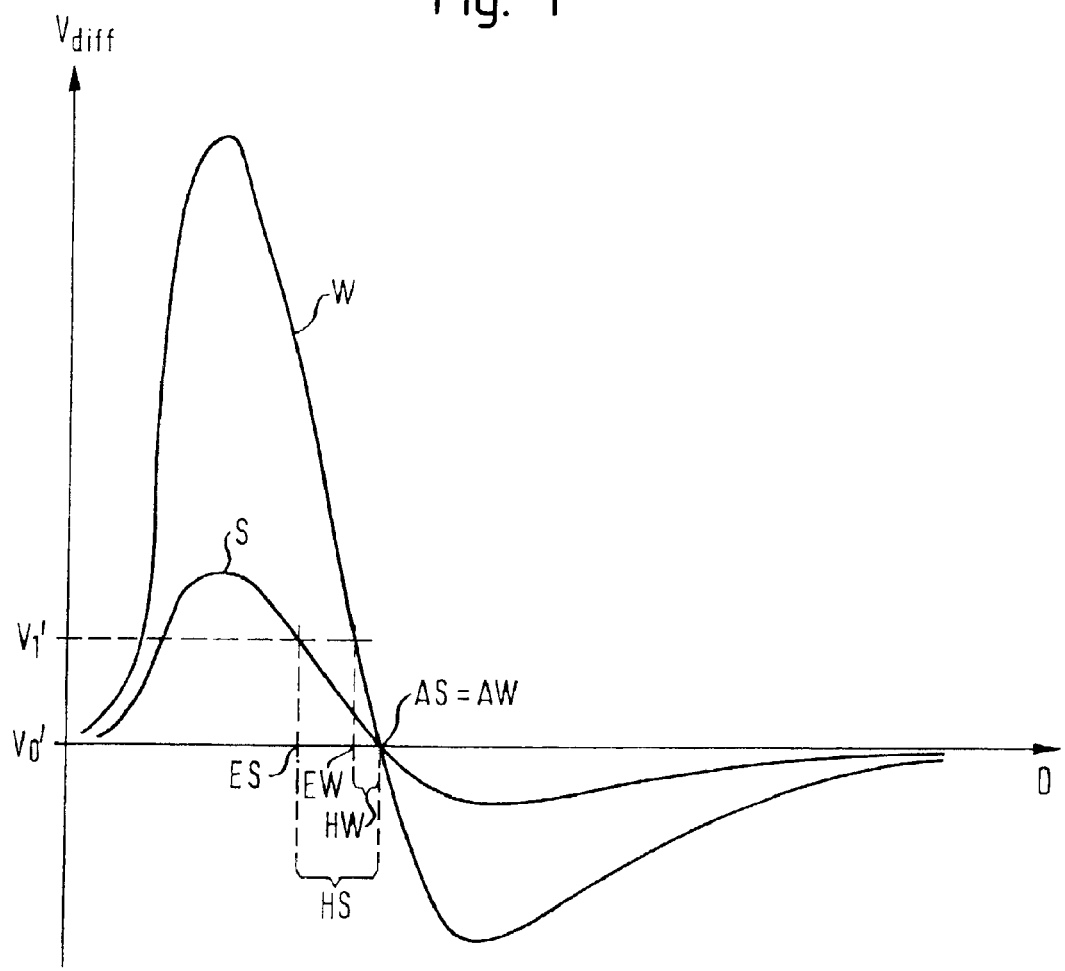

In contrast, FIG. 1 shows—likewise for a foreground reflection light scanner—the solution approach underlying the invention: Here the lower difference threshold $V_0'$ is set to the value 0. This has the consequence that the differential signal $V_{diff}$ intersects the lower difference threshold $V_0'$ at the same point both for the black object S and for the white object W so that ultimately the same switching off point AS or AW respectively is fixed for each reflectance.

A different length of the respective positioning hysteresis HS or HW admittedly also results here due to the different gradients of the differential signal $V_{diff}$. However, these positioning hystereses HS and HW differ such that the difference in the switching distances for a different reflectance is thereby clearly reduced with respect to the position of the difference thresholds $V_0'$ and $V_1'$ in accordance with FIG. 5.

As already explained, the fixing of the difference thresholds $V_0'$ and $V_1'$ shown in FIG. 1 is, however, already ruled out for known sensors because, with a lower difference threshold $V_0'$ of zero, a differentiation from that state in which an object is no longer in the field of view of the sensor is already no longer possible. For example, the object could be taken out of the foreground zone at the side without this sufficiently reliably resulting in a negative article detection signal.

Figure 2:
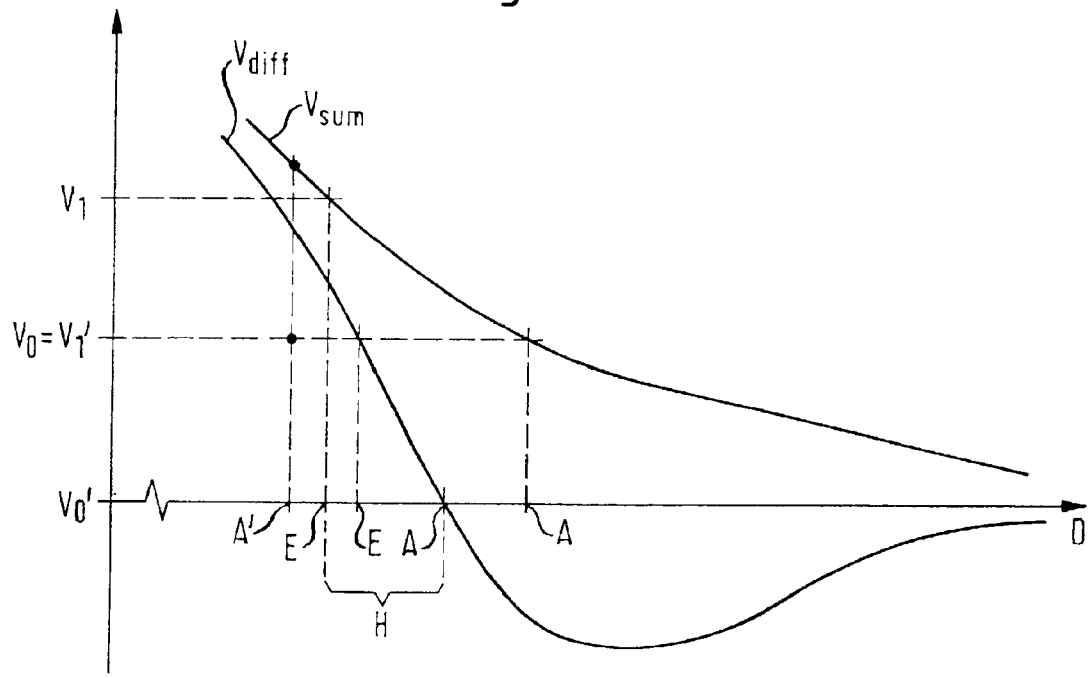
FIGS. 2 and 3 show a differential signal and a sum signal in dependence on the scanning distance for different thresholds.

FIG. 2 shows how such a possible erroneous detection can be avoided in the invention. A part of the differential signal $V_{diff}$ is shown and the associated sum signal $V_{sum}$, that is, the sum of the two received signals of the receiver, each in dependence on the scanning distance D.

For a comparison of the differential signal $V_{diff}$, a lower and an upper difference threshold $V_0'$ and $V_1'$ respectively are in turn provided. In addition, a lower and an upper sum threshold $V_0$ and $V_1$ respectively are shown which are each used for a comparison with the sum signal $V_{sum}$. In the example shown, the upper threshold $V_1'$ and the lower sum threshold $V_0$ coincide.

For the example of a foreground scanner, the condition is used as the basis for the production of a negative article detection signal that either the differential signal $V_{diff}$ is lower than the lower difference threshold $V_0'$ or the sum signal $V_{sum}$ is lower than the lower sum threshold $V_0$:

$$V_{diff} < V_0' \text{ or } V_{sum} < V_0$$

In contrast, the production of a positive article detection signal takes place under the condition that the differential signal is larger than the upper difference threshold $V_1'$ and, at the same time, the sum signal is larger than the upper sum threshold $V_1$:

$$V_{diff} > V_1' \text{ and } V_{sum} > V_1$$

The latter condition is the logical inversion of the former condition so that the two conditions can be easily implemented by complementary switching logic.

The positioning hysteresis H shown in FIG. 2 results from the two given switching conditions. The advantage explained in connection with FIG. 1 applies to this positioning hysteresis H, namely that the switching point A is not displaced for objects of a different reflectance and the respective positioning hystereses H therefore always overlap.

With respect to just a taking into account of the differential signal $V_{diff}$, the taking into account of the conditions, in particular the additional taking into account of the sum thresholds $V_0$ and $V_1$, provides the advantage that a clear and reliable switching off of the sensor is always ensured although the lower difference threshold $V_1'$ has the value 0 and thus lies within the RMS noise of the differential signal $V_{diff}$ for an object-free detection zone. The switching to a negative article detection signal is namely additionally ensured by the taking into account of the lower sum threshold $V_0$.

For example, the case can also be seen from FIG. 2 that—after the production of a positive article detection signal—the relevant object does not move out of the foreground region along the direction of view of the sensor (increasing scanning distance D), but instead exits this to the side with the same scanning distance D: As entered for the switching off point A', in this case the lower sum threshold $V_0$ is fallen below so that the negative article detection signal is thereby triggered.

It must still be noted with respect to the two switching conditions that both a differential comparison and a sum comparison do not necessarily have to be carried out for each switching direction. In particular, it can be sufficient as a condition for the production of a positive article detection signal that the differential signal $V_{diff}$ is larger than the upper difference threshold $V_1'$.

It must further be noted that for the application of the sensor as a background scanner with foreground masking only the sign of the differential signal has to be inverted, whereas the further processing can remain the same. For example, a check can then be made for the production of a positive article detection signal as to whether the inverse differential signal $-V_{diff}$ is larger than the upper difference threshold $V_1'$ and the sum signal $V_{sum}$ is larger than the upper sum threshold $V_1$. The logical inversion of this condition accordingly applies to a negative article detection signal.

Figure 3:
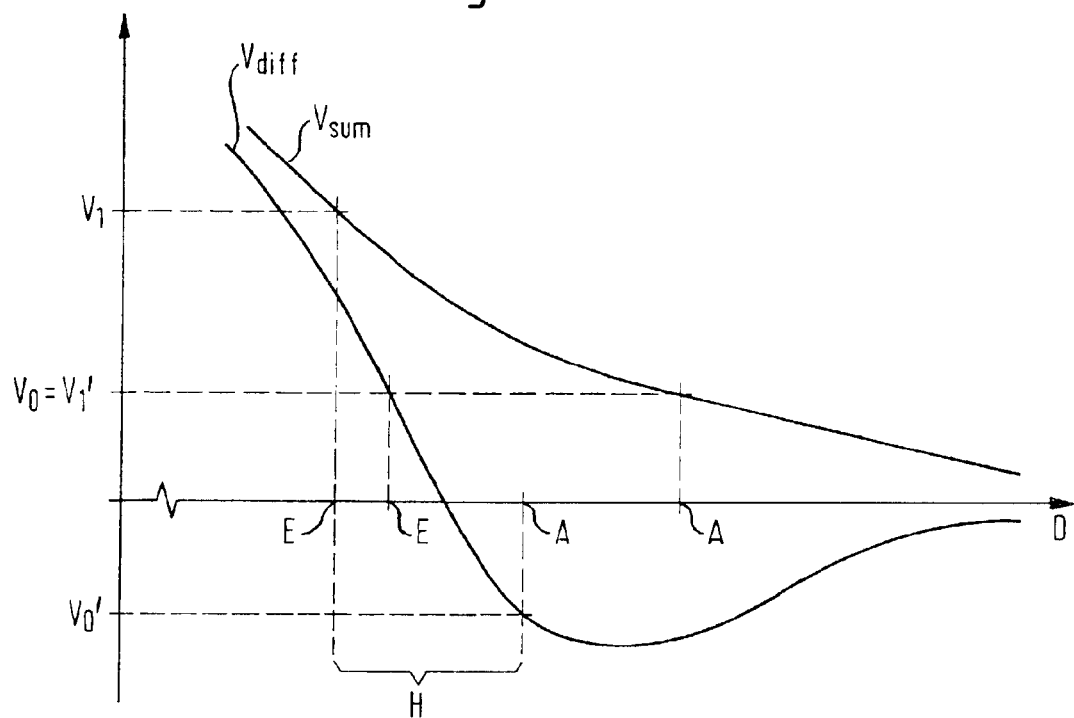

FIG. 3 shows a further example of the arrangement of the thresholds of a foreground scanner which substantially corresponds to the example in accordance with FIG. 2. However, here, the lower difference threshold $V_0'$ has a negative value, and the upper difference threshold $V_1'$—and with this the lower sum threshold $V_0$—is fixed with respect to the value zero symmetrically thereto.

When using the same switching on and switching off condition as a basis, the positioning hysteresis H drawn in FIG. 3 results. However, both the relevant switching on point E and the relevant switching off point A now change for the differential signals $V_{diff}$ of objects of a different reflectance. However, this change in the positioning hysteresis H takes place substantially symmetrically around the zero passage of the differential signal $V_{diff}$, with the positioning hysteresis H always being lower for objects of a larger reflectance than the positioning hysteresis H for darker objects.

Figure 4:
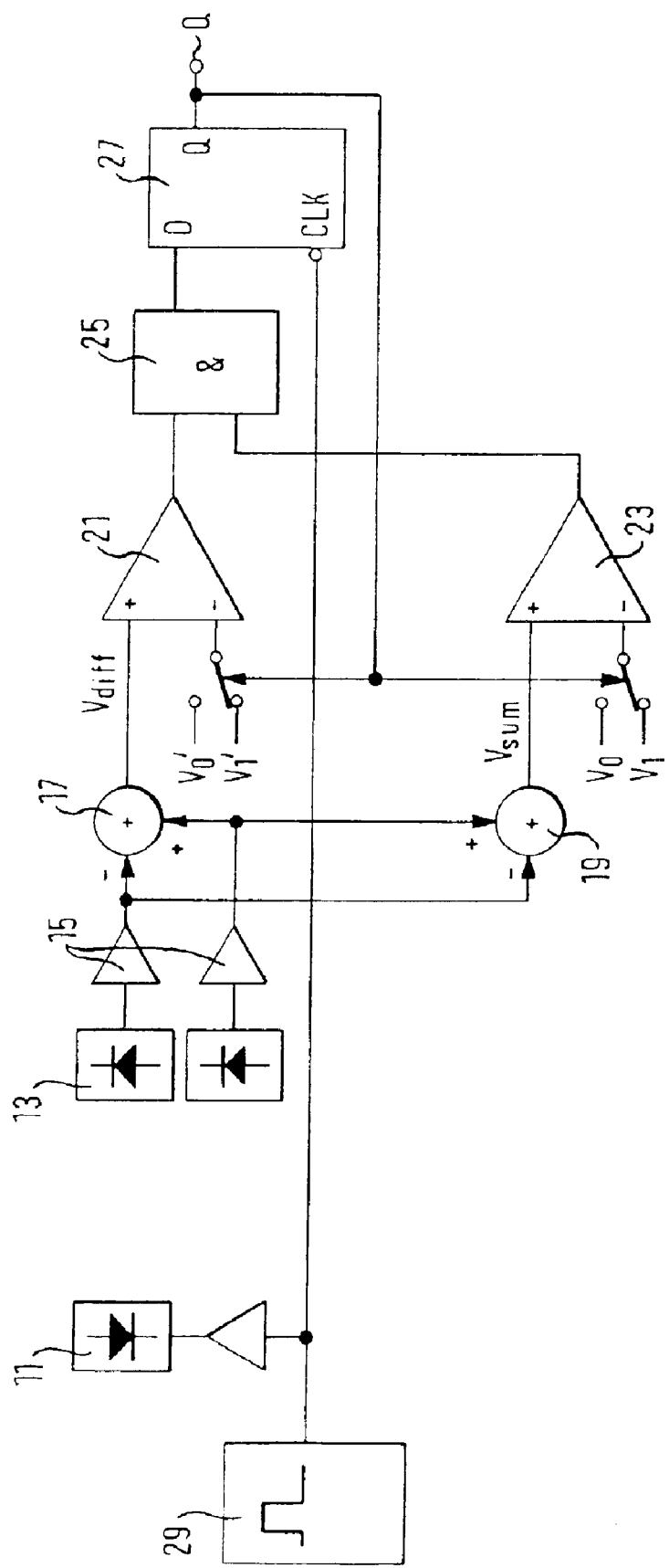
FIG. 4 is a block diagram of the sensor in accordance with the invention.

FIG. 4 schematically shows a possible design of the sensor in accordance with the invention.

This sensor has a transmitter 11 and a receiver 13, which forms a triangulation arrangement with the transmitter 11 and has two reception elements. For example, the receiver 13 can be a differential diode which transmits a near received signal and a far received signal.

The two received signals are forwarded to a differential stage 17 and to a summing unit 19 via a respective amplifier 15. The output signal of the differential stage 17 is applied at the positive input of a comparison device, that is, of a comparator 21, whose negative input is alternatively supplied to the lower difference threshold $V_0'$ or to the upper difference threshold $V_1'$. In a corresponding manner, the output signal of the summing unit 19 and alternatively the lower sum threshold $V_0$ and the upper sum threshold $V_1$ are supplied to the two inputs of a further comparator 23.

The output signals of the two comparators 21, 23 are logically linked by an AND gate 25. The AND gate 25 forwards the result of this link to the switching input of a flip-flop 27. The article detection signal Q, which simultaneously serves for the switching between the lower and the upper difference thresholds $V_0'$ and $V_1'$ respectively and the lower and upper sum thresholds $V_0$ and $V_1$ respectively, is produced at the switch output of the flip-flop 27.

A clock 29 feeds the transmitter 11 and the flip-flop 27 with a rectangular pulse.

The clock 29 causes the transmitter 11 to transmit pulsed transmission light signals. The light reflected from an object disposed in the detection zone of the sensor results on the part of the receiver 13 to the production of the two received signals which are transformed into the differential signal $V_{diff}$ and into the sum signal $V_{sum}$.

The condition of a negative article detection signal is represented in FIG. 4 for a foreground scanner; that is, a check is made by means of the comparators 21 and 23 and of the AND gate 25 whether the differential signal $V_{diff}$ is larger than the upper difference threshold $V_1'$ and whether the sum signal $V_{sum}$ is larger than the upper sum threshold $V_1$.

As soon as this condition is satisfied, the flip-flop 27 likewise clocked by the clock 29 switches to a positive article detection signal Q and, at the same time, the thresholds applied to the comparators 21, 32 are switched to their respective lower pre-set values $V_0'$ or $V_0$ respectively. From this point in time, the sensor therefore makes a check in the cycle of the clock 29 whether either the differential signal $V_{diff}$ is smaller than the lower difference threshold $V_0'$ or the sum signal $V_{sum}$ is smaller than the lower sum threshold $V_0$. A repeated switching can thus only take place when the intensity and the distribution of the light acting on the receiver 13, and thus the differential signal $V_{diff}$ and the sum signal $V_{sum}$, change sufficiently.

The switch design of the sensor in accordance with FIG. 4 is in particular advantageously simple because the switching hysteresis is controlled by the respective last determined article detection signal Q.

The sensor in accordance with FIG. 4 can also be further developed such that a switching of the article detection signal Q only takes place when the switching condition provided for this is satisfied during a plurality of successive cycles of the clock 29. For this purpose, a plurality of flip-flops cycled by the clock 29 can be provided, with the switch output of a preceding flip-flop being applied at the switch input of the respective subsequent flip-flop. Erroneous switching caused, for example, by an external flashlight can be avoided by such a design.

Finally, it must be noted with respect to the sensor in accordance with FIG. 4 that measures can also be provided to be able to set the switching distance. For example, the position of the light spot on the receiver 13 can be set by an adjustable receiver lens or by a mirror to pre-set that distance at which the differential signal $V_{diff}$ adopts the value zero.

We claim:

1. An optoelectronic sensor, the sensor comprising
    a transmitter for transmitting transmitted light;
    a receiver for outputting at least two received signals in dependence on reflected and received transmitted light; and
    an evaluation device for determining whether an object or no object is disposed in a detection zone of the sensor, wherein at least one of a difference and a sum of the received signals is compared with one of an upper threshold and a lower threshold, and a positive or negative article detection signal is produced in dependence on the result of the comparison, wherein the upper and lower thresholds are provided to produce a switching hysteresis, wherein a single threshold of the upper threshold or lower threshold is selected in dependence on the article detection signal for the comparison of the at least one of a difference and a sum of the received signals with the single threshold respectively.

2. A method for producing a positive or a negative article detection signal in dependence on the presence or absence of an object in a detection zone of an optoelectronic sensor, the method comprising:

transmitting light in a direction of the detection zone;

producing at least two received signals in dependence on reflected and received transmitted light; and comparing at least one of a difference and a sum of the received signals with one of an upper threshold and a lower threshold to produce the positive or negative article detection signal;

with the upper and lower thresholds being taken into account to produce a switching hysteresis, wherein a single threshold of the upper or lower thresholds is selected in dependence on the article detection signal for the comparison of the at least one of a difference and a sum of the received signals with the single threshold respectively.

3. An optoelectronic sensor, the sensor comprising a transmitter for transmitting transmitted light;

a receiver for outputting at least two received signals in dependence on reflected and received transmitted light; and an evaluation device for determining whether an object or no object is disposed in a detection zone of the sensor, wherein a difference of the received signals is compared with one of an upper difference threshold and a lower difference threshold, and a positive or negative article detection signal is produced in dependence on a result of the comparison, wherein the upper and lower difference thresholds are provided to produce a switching hysteresis, wherein the evaluation device is configured such that a result of a comparison of a sum of the received signals with a sum threshold is provided as an additional criterion for the production of the article detection signal, wherein a single threshold of the upper difference threshold or lower difference threshold is selected in dependence on the article detection signal for the comparison of the difference of the received signals with the single threshold respectively.

4. A sensor in accordance with claim 3, wherein there are provided for the production of the switching hysteresis wherein the sum threshold comprises a lower sum threshold and an upper sum threshold for the sum comparison (sum thresholds); or the lower difference threshold and the upper difference threshold and the lower sum threshold or upper sum threshold; or the lower difference threshold or upper difference threshold and the lower and upper sum thresholds.

5. A sensor in accordance with claim 3, wherein a provision is made as a condition for the production of a negative—or a positive—article detection signal that either the difference of the received signals is lower than the lower difference threshold; or the sum of the received signals is lower than the lower sum threshold.

6. A sensor in accordance with claim 3, wherein a provision is made as the condition for the production of a positive—or of a negative—article detection signal wherein the difference of the received signals is larger than the upper difference threshold; and the sum of the received signals is larger than the upper sum threshold.

7. A sensor in accordance with claim 3, wherein a provision is made as the condition for the production of a positive—or of a negative—article detection signal that the difference of the received signals is larger than the upper difference threshold.

8. A sensor in accordance with claim 3, wherein the first threshold comprises a lower difference threshold and an upper difference threshold, wherein the lower difference threshold is substantially zero.

9. A sensor in accordance with claim 3, wherein the upper and lower difference thresholds have different signs; and/or the upper difference threshold and the lower difference threshold are arranged substantially symmetrically around the value zero.

10. A sensor in accordance with claim 3, wherein the sum threshold comprises a lower sum threshold and an upper sum threshold, wherein the upper difference threshold corresponds to the lower sum threshold; or wherein the upper and/or lower difference threshold and the upper and/or lower sum threshold are different.

11. A sensor in accordance with claim 3, wherein the transmitter and the receiver form a triangulation arrangement; and/or wherein the receiver has a plurality of reception sections or reception elements to produce the at least two received signals; and/or wherein the at least two received signals are a near received signal and a far received signal.

12. A sensor in accordance with claim 3, wherein the sensor is made as a foreground scanner or as a background scanner.

13. A sensor in accordance with claim 3, wherein a clock is provided by which the transmitter can be selected to transmit pulsed transmitted light.

14. A sensor in accordance with claim 13, wherein the evaluation device is made such that a positive or a negative article detection signal can only be produced when the respective condition is satisfied during a plurality of successive cycles of the clocks.

15. A sensor in accordance with claim 3, wherein the single threshold is switched between the upper difference threshold and the lower difference threshold.

16. A sensor in accordance with claim 3, further comprising:

a differential stage coupled to a first input of the a first comparator;

a summing unit connected to a first input of a second comparator;

and AND gate that logically links output signals of the first and second comparators;

a flip-flop that receives an output of the AND gate, wherein a switch output of the flip-flop produces the article detection signal and is coupled to a second input of the first comparator and a second input of the second comparator in order to switch between the lower difference threshold and the upper difference threshold at the second input of the first comparator and the second comparator.

17. A method for producing a positive or a negative article detection signal in dependence on the presence or absence of an object in a detection zone of an optoelectronic sensor, the method comprising:

transmitting light in a direction of the detection zone;

producing at least two received signals in dependence on reflected and received transmitted light; and comparing a difference in the received signals with one of an upper difference threshold and a lower difference threshold to produce the positive or negative article detection signal;

with the upper and lower difference thresholds being taken into account to produce a switching hysteresis, wherein a sum of the received signals is compared with a sum threshold as an additional criterion for the production of the article detection signal, wherein a single threshold of the upper or lower difference thresholds is selected in dependence on the article detection signal for the comparison of the difference in the received signals with the single threshold respectively.

18. A method in accordance with claim 17, further comprising switching the single threshold between the upper difference threshold and the lower difference threshold.

* * * * *